(12) United States Patent
Kumasaka et al.

(10) Patent No.: US 7,857,876 B2
(45) Date of Patent: Dec. 28, 2010

(54) METHOD OF PRODUCING POLISHING MATERIAL COMPRISING DIAMOND CLUSTERS

(75) Inventors: Noriyuki Kumasaka, Tokyo (JP); Yuji Horie, Tokyo (JP); Mitsuru Saito, Tokyo (JP); Kazuei Yamaguchi, Tokyo (JP)

(73) Assignee: Nihon Micro Coating Co., Ltd., Tokyo (JP)

( * ) Notice: Subject to any disclaimer, the term of this patent is extended or adjusted under 35 U.S.C. 154(b) by 119 days.

(21) Appl. No.: 12/420,557

(22) Filed: Apr. 8, 2009

(65) Prior Publication Data

US 2009/0188170 A1 Jul. 30, 2009

Related U.S. Application Data

(60) Division of application No. 11/805,458, filed on May 23, 2007, now Pat. No. 7,585,341, which is a continuation of application No. PCT/JP2006/021690, filed on Oct. 31, 2006.

(30) Foreign Application Priority Data

Oct. 31, 2005 (JP) ............................. 2005-315582

(51) Int. Cl.
*B24D 3/02* (2006.01)
*C09C 1/68* (2006.01)
*C09K 3/14* (2006.01)
*H01L 21/302* (2006.01)
*C09G 1/02* (2006.01)
*B24B 1/00* (2006.01)
*B24B 7/19* (2006.01)

(52) U.S. Cl. .................. 51/307; 438/691; 438/692; 438/693; 423/446; 106/3; 451/36; 451/63

(58) Field of Classification Search ................ 51/307; 438/691–693; 423/446; 451/36, 63; 106/3
See application file for complete search history.

(56) References Cited

U.S. PATENT DOCUMENTS

| 3,661,521 | A * | 5/1972 | Birle ............................ 423/290 |
| 3,711,595 | A * | 1/1973 | Margave et al. ............. 423/446 |
| 6,315,871 | B1 * | 11/2001 | Daulton et al. ......... 204/157.47 |
| 2003/0228249 | A1 * | 12/2003 | Fujimura et al. ............. 423/446 |
| 2007/0123153 | A1 * | 5/2007 | Kumasaka et al. ............ 451/41 |

\* cited by examiner

*Primary Examiner*—Anthony J Green
*Assistant Examiner*—Pegah Parvini
(74) *Attorney, Agent, or Firm*—Weaver Austin Villeneuve & Sampson LLP

(57) ABSTRACT

Diamond clusters are used as a polishing material of free abrading particles, each being a combination of artificial diamond particles having primary particle diameters of 20 nm or less and impurities that are attached around these diamond particles. The density of non-diamond carbon contained in the impurities is in the range of 95% or more and 99% or less, and the density of chlorine contained in other than non-diamond carbon in the impurities is 0.5% or more and preferably 3.5% or less. The diameters of these diamond clusters are in the range of 30 nm or more and 500 nm or less, and their average diameter is in the range of 30 nm or more and 200 nm or less. Such polishing material is produced first by an explosion shock method to obtain diamond clusters and then removing the impurities such that density of non-diamond carbon contained in the impurities and density of chlorine contained in other than non-diamond carbon in the impurities become adjusted.

8 Claims, 2 Drawing Sheets

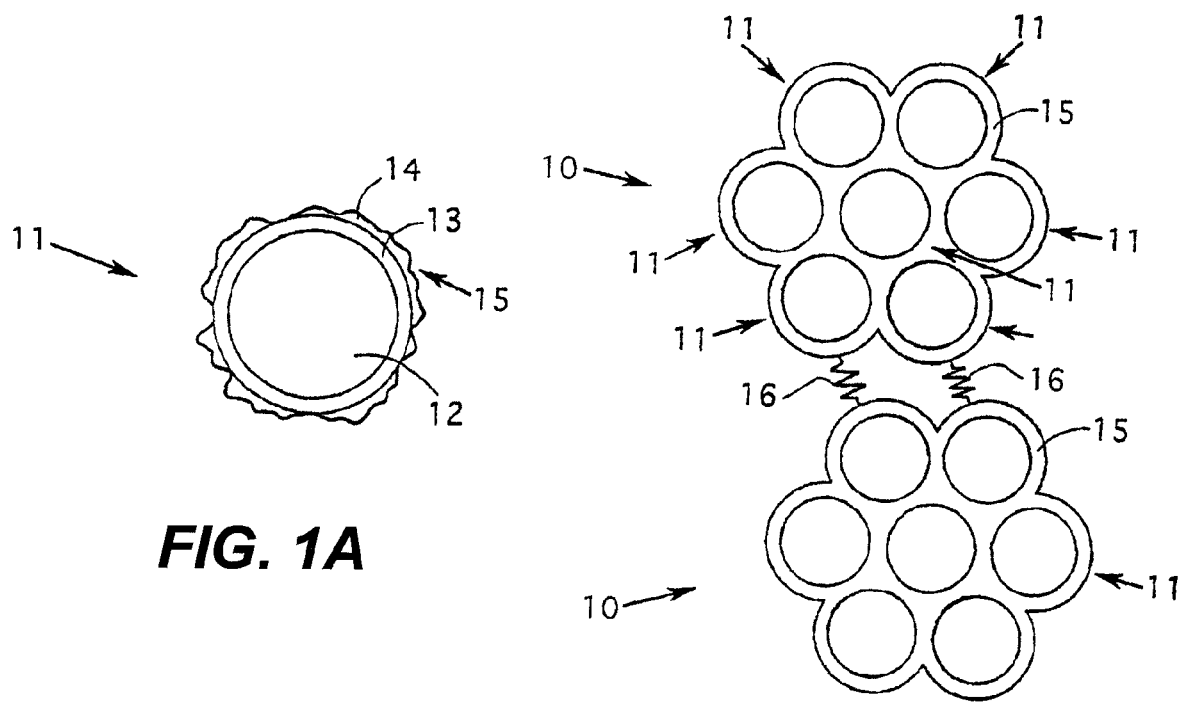
FIG. 1A
FIG. 1B
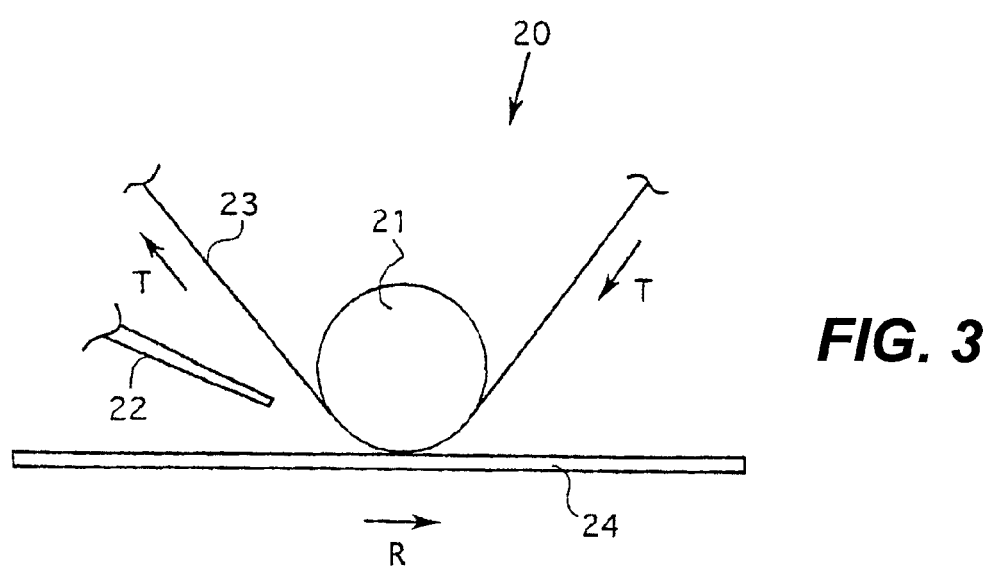
FIG. 3

METHOD OF PRODUCING POLISHING MATERIAL COMPRISING DIAMOND CLUSTERS

This is a divisional of application Ser. No. 11/805,458 filed May 23, 2007, now U.S. Pat. No. 7,585,341.

BACKGROUND OF THE INVENTION

This invention relates to a method of producing a polishing material used as free abrading particles for processing the surface of an object made of a metal or a non-metal such as ceramics and plastics.

The surface to be worked upon of a target object made of a metal or a non-metal such as ceramics and plastics is usually processed by using free abrading particles, or by causing slurry with an abrading material dispersed therein to be present between the surface of the target object and a polishing cloth and moving the target object and the polishing cloth relative to each other.

In such a process, a tape or a pad made of a woven cloth, an unwoven cloth, a flocked cloth, a raised cloth or a foamed material capable of taking in debris generated during the polishing process and elastically acting on the surface of the target object is used as the polishing cloth.

As disclosed in Japanese Patent Publications Tokkai 6-121923 and 2005-131711, furthermore, texturing slurry containing diamond clusters as abrading particles is being used. Diamond clusters mean a bunched combination of particles of artificial diamond obtained by an explosion shock method such as described in Japanese Patent Publications Tokkai 6-121923 and 2005-131711, by Eiji Oosawa in "Details of nano-diamond by oxygenless explosion method," Journal of Toryu Gakkai, Vol. 47, No. 8 (August, 2003) at pages 414-417, by Kotaro Hanada in "Characteristics of diamond clusters and their application to solid lubrication," ibid., Vol. 47, No. 8 (August, 2003) at pages 422-425, and by Masanori Araki in "Method of producing diamond and high-pressure technologies," Technology Development News, No. 75 (January, 1998) at pages 3-4 (obtainable from internet address http://www.chuden.co.jp/torikumi/news/pdf/075/NO7503.pdf).

Mechanism of texturing by diamond clusters will be explained first. Diamond clusters dispersed as polishing materials in slurry are carried inside the surface portion of the polishing cloth being pressed against the surface of the target object during the processing and are thereby pressed against the target object surface. Larger diamond clusters break up as they are carried in the surface portion of the polishing cloth and become diamond clusters of an appropriate size while being pressed against the target surface. These diamond clusters act on and polish the target surface while being carried inside the surface portion of the polishing cloth.

Since diamond clusters are formed with extremely small artificial diamond particles with primary particle diameter of 20 nm or smaller, it is considered possible to process the surface of a target object with a high level of accuracy.

There is currently a problem, however, that spots appear although texturing slurry having a polishing material comprising diamond clusters is used to process the surface of a target object. There remain fluctuations in the quality of the products after the processing, and it is not possible to obtain products with good reproducibility.

For the texturing of substrates for a magnetic hard disk, for example, slurry having a polishing material comprising diamond clusters dispersed therein is supplied to the surface of a rotating substrate (as an example of the aforementioned target object), a polishing tape (as an example of the aforementioned polishing cloth) is pressed to it and this tape is caused to travel so as to form approximately concentric circular texturing marks on the surface of the substrate. Texturing marks with a line density of 40 lines/μm or more can be formed by a process as described above but spots do appear, making the texturing marks locally unclear, causing fluctuations in the quality of the substrates after the processing. In other words, it is currently not possible to produce substrates of a specified quality level with good reproducibility.

Thus, there is currently a demand in the field of polishing technology for a new method of producing with good reproducibility products of a specified level of accuracy without spots.

SUMMARY OF THE INVENTION

It is therefore an object of this invention to provide a polishing material capable of producing with good reproducibility products of a specified level of accuracy without spots, as well as a method of producing such polishing material.

Spots come about for the following reasons. Diamond clusters are pressed against the surface of a target object to be polished only while they are being held in the surface portion of a polishing cloth which is pressed against the surface of the target object. Since this polishing cloth and the surface of the target object are moving relative to each other, the diamond clusters on the surface of the polishing cloth are caused to act on and polish the target object surface.

Particles of artificial diamond obtained by an explosion shock method have rounded corners, and there are no sharp edges. Diamond clusters are clusters of such diamond particles, having an indefinite shape without sharp edges, but they have protruding parts. During a texturing process, these protruding parts engage with the surface portion of the polishing cloth so as to support the clusters in the surface part of the polishing cloth. In other words, it may be thought that the diamond clusters are then temporarily attached to the surface portion of the polishing cloth.

Since diamond clusters have indefinite shapes as a whole, the force for attaching them temporarily to the polishing cloth is individually different. Moreover, the force for the attachment due only to the protruding parts of the diamond clusters is not sufficiently strong such that the density of diamond clusters supported in the surface part of the polishing cloth also varies locally, and this is believed to be the cause of spots that are generated. It is also believed that the diamond clusters in the slurry are in a condition of easily being taken into the internal part of the polishing cloth.

On the basis of the above, the inventors herein discovered that products of a specified level of accuracy can be produced with good reproducibility without forming spots if a specified density of chlorine is included in the impurities of the diamond clusters obtained by an explosion shock method.

A polishing material of this invention, with which the objects of the invention can be accomplished, is adapted to be used as free abrading particles and may be characterized as comprising diamond clusters, each of these clusters being a combination of artificial diamond particles having primary particle diameters of 20 nm or less and impurities that are attached around the diamond particles.

For accomplishing the object of this invention, the density of non-diamond carbon contained in the impurities is in the range of 95% or more and 99% or less, and the density of chlorine contained in other than non-diamond carbon in the impurities is 0.5% or more and preferably 3.5% or less. The diameters of these diamond clusters are in the range of 30 nm or more and 500 nm or less, and their average diameter (D50) is in the range of 30 nm or more and 200 nm or less.

A method of producing such a polishing material according to this invention may be characterized as comprising a cluster forming process of obtaining diamond clusters by an explosion shock method, each of these diamond clusters being a combination of artificial diamond particles having primary particle diameters of 20 nm or less and impurities that are attached around these diamond particles and an impurity removing process of removing these impurities such that the density of non-diamond carbon contained in these impurities becomes 95% or more and 99% or less and that the density of chlorine contained in other than non-diamond carbon in these impurities becomes 0.5% or more and preferably 3.5% or less.

The production method of this invention may further include a classification process of classifying the diamond clusters after the impurity removing process, this classification process including the step of separating out of the diamond clusters after the impurity removing process those that have diameters 30 nm or more and 500 nm or less and an average diameter of 30 nm or more and 200 nm or less.

In the above, the impurity removing process may include an acid treatment process of carrying out an acid treatment on the diamond clusters by using a condensed acid of at least one kind selected from the group consisting of perchloric acid, condensed sulfuric acid, condensed nitric acid and condensed hydrochloric acid, wherein the condensed acid contains at least chlorine. In this acid treatment process, the density of chlorine in the impurities of the diamond clusters can be adjusted by varying the processing temperature, the processing time and the "time of leaving" (or the time during which it is left standing). Affinity to water may also be provided by creating hydrophilic atoms such as chlorine and oxygen and of hydrophilic atom groups such as hydroxyl groups, carboxyl groups and carbonyl groups. Dispensability may be provided with such affinity to water.

The impurity removing process may further include a crushing process of mechanically crushing the diamond clusters prior to the acid treatment process. Prior to this crushing process, those of the diamond clusters after the cluster forming process having diameters in the range of 30 nm or more and 500 nm or less may be separated. In such a case, those clusters with diameters in this range are mechanically crushed.

As a variation, the diamond clusters after the acid treatment process may be subjected to the crushing process. In this case, a second acid treatment process is carried out on the crushed diamond clusters by using one or more kinds of condensed acid selected from the group consisting of perchloric acid, condensed sulfuric acid, condensed nitric acid and condensed hydrochloric acid. The second acid treatment process is similar to the aforementioned acid treatment process in that a condensed acid containing chlorine is used for the treatment of the diamond clusters. In this case, those of the diamond clusters after the aforementioned acid treatment having diameters 30 nm or more and 500 nm or less are separated prior to the crushing process. If this is done, the separated diamond clusters with diameters 30 nm or more and 500 nm or less are mechanically crushed in the crushing process.

According to this invention, since the density of non-diamond carbon in the impurities of the diamond clusters forming the polishing material is 95% or more and 99% or less and the density of chlorine in other than non-diamond carbon of the impurities is 0.5% or more, the polishing material is more easily supported on the surface portion of the polishing cloth during the polishing operation and hence products having a specified level of accuracy without spots can be produced with good reproducibility.

BRIEF DESCRIPTION OF THE DRAWINGS

FIG. 1A is a sectional view of an artificial diamond particle of a polishing material of this invention, and FIG. 1B is a sectional view of a diamond cluster of a polishing material of this invention.

FIG. 3 is a schematic drawing showing the structure of an apparatus for carrying out this invention.

DETAILED DESCRIPTION OF THE INVENTION

The polishing material according to this invention is used as free abrading particles and, as shown in FIG. 1, comprises diamond clusters 10 having artificial diamond particles 11 with primary particle diameters of 20 nm or less combined together in the form of a cluster (like a bunch).

Figure 2A:
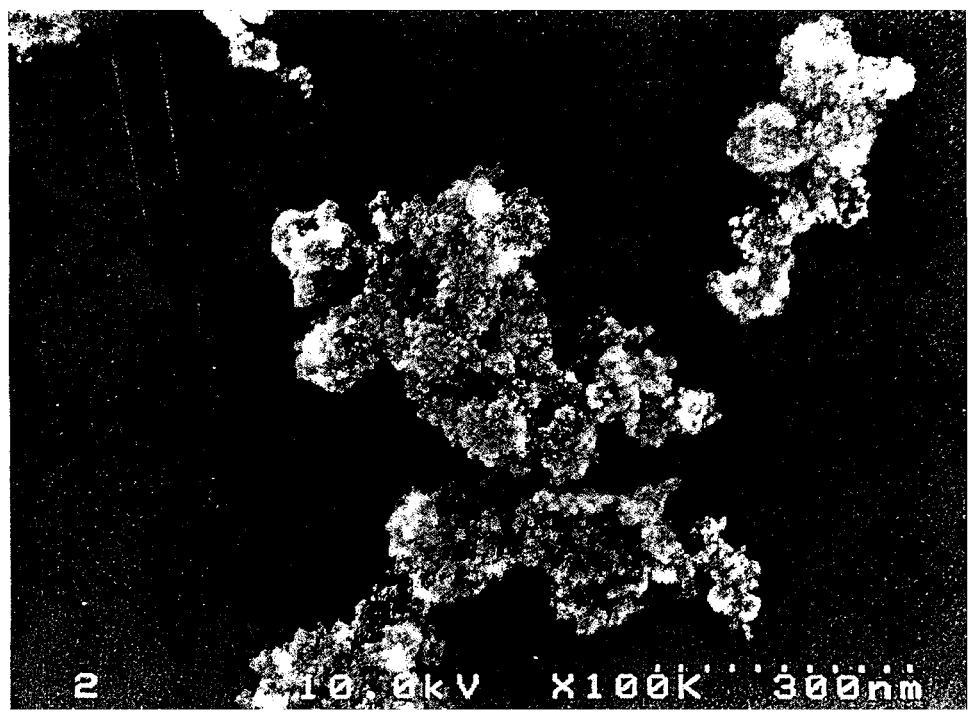
FIG. 2A is an electron microscope photograph of diamond clusters of a polishing material of this invention.
Figure 2B:
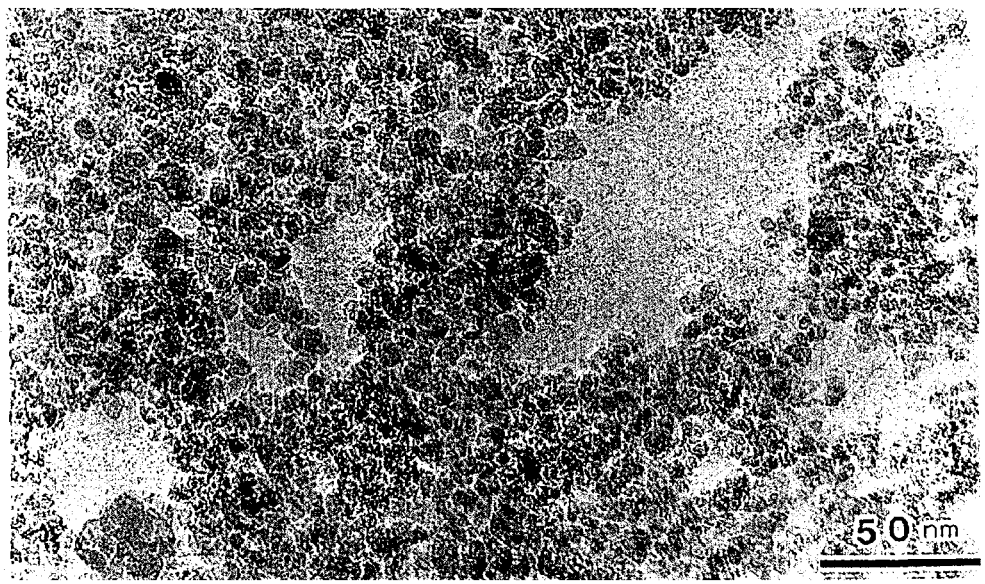
FIG. 2B is an enlargement (10000 times) of a portion of the photograph of FIG. 2A.

As shown in FIG. 2B, artificial diamond particles 11 have rounded corners, having no sharp edges. The diamond clusters 10 are combinations of such artificial diamond particles 11 in the form of a cluster. Although the diamond clusters 10 have no sharp protrusions, their forms are indefinite and there are angular corners, as shown in FIG. 2A. Although artificial diamond particles can be produced also by a hydrostatic method of a known kind (such as disclosed by Masanori Araki as cited above), since artificial diamond particles produced by a hydrostatic method have sharp and angular protrusions, they tend to get stuck in the surface of the target object or to form scratches on the surface of the target object. The artificial diamond particles which form the diamond clusters 10 of the polishing material of this invention are produced by an explosion shock method and different from the artificial diamond particles made by a hydrostatic method in that they have round corners and have no sharp edges.

As shown in FIG. 1A, artificial diamond particles 11 have onion-like carbon 13 formed around its core diamond (carbon) 12 with a chemically active boundary layer 14 formed around this onion-like carbon 13. Impurities 15 include the onion-like carbon 13 and the chemically active boundary layer 14. In the above, the chemically active boundary layer 14 includes carbon atoms, other atoms, functional groups, chemical materials which became attached by a chemical process (the acid treatment to be described above) and metal particles.

According to the present invention, the density of non-diamond carbon contained in the impurities 15 of diamond cluster 10 is in the range of 95% or greater and 99% or less, and the density of chlorine in the impurities other then non-diamond carbon of the diamond cluster 10 is 0.5% or greater and preferably in the range of 5% or greater and 3.5% or less. If this density of chlorine is less than 0.5%, since the diamond clusters 10 tend to be too easily taken into the polishing cloth (a tape or a pad of a woven cloth, a non-woven cloth, a flocked cloth, a raised cloth or a foamed material) and it becomes harder to keep the diamond clusters 10 in the surface portion of the polishing cloth (where the surface of the polishing cloth works on the surface of the target object to be processed), not only is the polishing power reduced but also processing spots come to be generated. The diameters of the diamond clusters are in the range of 30 nm or greater and 500 nm or less, and preferably in the range of 30 nm or greater and 350 nm or less. The average cluster diameter (D50) is in the range of 30 nm or greater and 200 nm or less.

The polishing materials according to this invention as described above may be produced firstly by using an explosion shock method to prepare diamond clusters with artificial diamond particles of primary particle diameters 20 nm or less having impurities attached around them and joined together in the form of clusters (the cluster forming process). In the above, the non-diamond carbon includes not only onion-like carbon but also carbon materials (non-reacted graphite) remaining after the cluster generating process.

A polishing material of this invention is obtained by next removing the impurities from these diamond clusters such that the density of non-diamond carbon in the impurities is in the range of 95% or greater and 99% or less and the density of chlorine contained the in impurities other than non-diamond carbon in the diamond clusters is 0.5% or greater and more preferably in the range of 0.5% or greater and 3.5% or less (the impurity removing process).

A production method according to this invention may include the step of classifying the diamond clusters after the impurity removing process. This is a process of classifying the diamond clusters after the diamond clusters which have been washed subsequently to the impurity removing process are classified. The classification is carried out by using a centrifugal separator of a known kind and may be carried out by a dry method or a wet method. By this process, diamond clusters with a desired average cluster diameter can be separated according to a desired degree of accuracy. If the average cluster diameter is made smaller, the roughness of the target surface that is processed becomes smaller.

The aforementioned classification step includes the step of separating out of diamond clusters after the impurity-removing process those having cluster diameters within the range between 30 nm and 500 nm and average cluster diameter (D50) within the range between 30 nm and 200 nm. If the centrifugal force applied on the diamond clusters by means of the centrifugal separator in this process is changed in a stepwise fashion, it is possible to separate out diamond clusters with cluster diameters within the range between 30 nm and 500 nm and the average cluster diameters (D50) of 80 nm, 120 nm and 150 nm in a stepwise fashion.

The cluster forming step is the step for using an explosion shock method to form diamond clusters with artificial diamond particles surrounded by impurities combined together, as explained above.

The explosion shock method is a method of forming diamond artificially by means of a force of explosion of an explosive. Artificial diamond may be obtained by compressing a mixture of materials for diamond including carbon (graphite) and metallic powder of copper and iron at a high temperature and high pressure by means of the shock waves generated by the explosion of an explosive (the graphite shock-wave compression method) or by exploding an explosive such as TNT, RDX and HMX usable as a source of carbon within a container filled with helium gas (the oxygenless explosion method).

Diamond clusters formed by an explosion shock method contain onion-like carbon particles and also have impurities such as metals like copper and iron and non-reacted carbon (graphite) attached thereto. Combinations of a plurality of diamond clusters 10 joined together by a binding force 16 as shown in FIG. 1B are also produced by an explosion shock method.

The impurity removing process of this invention includes an acid treatment process by using a condensed acid of one or more kinds selected from perchloric acid ($HClO_4$), condensed sulfuric acid ($H_2SO_4$), condensed nitric acid ($HNO_3$) and condensed hydrochloric acid (HCl) to subject the diamond clusters after the cluster-generating process to an acid treatment. The acid treatment in the above at least includes the step of using a condensed acid containing chlorine to subject the diamond clusters to an acid treatment. In this manner, the chemically active boundary layer 14 can be formed around the onion-like carbon 13 as shown in FIG. 1A.

For example, a condensed acid such as perchloric acid is used to remove non-reacted graphite (non-diamond carbon) from around diamond clusters first and a mixture of condensed nitric acid and condensed sulfuric acid is used to remove metals (mainly Cu, Fe, Cr and Ti) from diamond clusters. A mixture of condensed nitric acid and condensed sulfuric acid is further used to partially remove non-diamond carbon (such as onion-like carbon and non-reacted graphite) from diamond clusters.

In this acid treatment, the density of non-diamond carbon contained in the impurities and the density of chlorine contained in the impurities other than non-diamond carbon of diamond clusters can be adjusted by varying the processing temperature, processing time and the time during which it is left standing. It is also possible to form hydrophilic atoms such as chlorine and oxygen or hydrophilic atom groups such as hydroxyl groups, carboxyl groups or carbonyl groups around diamond clusters so as to provide hydrophilic characteristic.

The impurity removing process includes a process of mechanically crushing the diamond clusters prior to the acid treatment process "the crushing process".

Diamond clusters generated by the explosion shock method include those that are formed with small diamond clusters bound together or artificial diamond particles bound together by a weak binding force (such as indicated by numeral 16 in FIG. 1B). These small diamond clusters and artificial diamond particles that are bound together by such a weak binding force become dissociated easily either before they are used as abrading particles or during the texturing process and easily become taken into the interior of the porous tape during the processing as the impurities not subjected to the acid treatment become exposed such that the density of non-diamond carbon contained in the impurities of diamond clusters or the density of chlorine contained in the impurities other than non-diamond carbon changes and becomes outside the aforementioned range.

It is for this reason that small diamond clusters and artificial diamond particles that are bound together by a weak binding force are separated from diamond clusters by the crushing process. This crushing process may be carried out by using a crushing machine of a known kind such as a ball mill, an impact mill, an oscillation mill and a planetary mill.

As a result of this crushing process, metals such as copper and iron come to be attached to diamond clusters as impurities and since the artificial diamond particles which were positioned inside diamond clusters prior to the crushing process come to be externally exposed, this means that diamond clusters after the crushing process include not only the impurities that are generated by the crushing process but also those newly exposed impurities generated by the cluster forming process.

These impurities are removed from diamond clusters by the aforementioned acid treatment such that density of non-diamond carbon in the impurities of diamond clusters will be within the range between 95% and 99% and the density of chlorine in the impurities other than non-diamond carbon will be 0.5% or greater (or preferably within the range between 0.5% and 3.5%).

Prior to this crushing process, those of diamond clusters after the aforementioned cluster forming process having diameters within the range between 30 nm and 500 nm may be separated away. In this case, separated diamond clusters with diameters within the range between 30 nm and 500 nm are crushed by the crushing process.

Alternatively, diamond clusters may be mechanically crushed (crushing process) after the acid treatment process. In this case, in order to remove the newly generated impurities after the crushing process, condensed acid of one or more kinds selected from perchloric acid, condensed sulfuric acid, condensed nitric acid and condensed hydrochloric acid is used to subject the diamond clusters after the crushing process to a second acid treatment (second acid treatment process). The second acid treatment process, like the aforementioned acid treatment process, includes the process of carrying out an acid treatment on diamond clusters by using a condensed acid at least including chlorine.

Prior to this crushing process, those of diamond clusters after the aforementioned acid treatment process having diameters within the range between 30 nm and 500 nm may be separated away. In this case, diamond clusters separated after the acid treatment process and having diameters within the range between 30 nm and 500 nm are crushed by the crushing process and small diamond clusters and artificial diamond particles bound by a weak binding force are subjected to the acid treatment of the second acid treatment process after they are separated from diamond clusters.

The surface of a target object made of a metal or a non-metal material such as ceramics and plastics is processed by using a polishing material described above as free abrading particles. More specifically, slurry having such a polishing material of this invention is caused to be present between the surface of a target object and a polishing cloth and the target object and the polishing cloth are caused to move relative to each other.

A tape or a pad made of a woven cloth, a non-woven cloth, a flocked cloth, a raised cloth or a foamed material, capable of taking in into its interior debris generated during the processing and elastically acting on the surface of the target object is used as the polishing cloth.

Water or a liquid obtained by adding an additive to water is used as a dispersing medium for the polishing material of this invention to be dispersed in the slurry. As the additive, an agent containing one or more selected from the group consisting of process accelerators, dispersants, lubricants, chelating agents, anti-rust agents and water-soluble organic polymers is added to water.

Examples of process accelerator include higher fatty acid amides and ammonium oxalate. Examples of higher fatty acid amide include oleic acid diethanolamide, stearic acid diethanolamide, lauric acid diethanolamide, ricinolic acid diethanolamide, ricinolic acid isopropanolamide, ersinic acid diethanolamide, and tol fatty acid diethanolamide. Among these examples, those with 12-22 carbon atoms are preferred.

Glycol compounds, derivatives of carboxylic acid and nonionic or anionic surfactants may be used as a dispersant. A dispersing medium can be uniformly prepared if a glycol compound or a derivative of carboxylic acid is used because the viscosity of the medium is thereby reduced. Since they have affinity to water, the substrate can be washed more effectively after the process. Examples of glycol compound that may be used include alkylene glycol, polyethylene glycol, polypropylene glycol and diethylene glycol butylether.

Water-soluble glycerol may be used as the lubricant.

Examples of chelating agent that may be used include the amino-carboxylic acid type such as ethylene diamine tetra-acetic acid, hydroxyethylene diamine diacetic acid, diethylene triamine penta-acetic acid, triethylene tetramine hexa-acetic acid, hydroxyethyl imino diacetic acid, dihydroxyethyl glycine, 1-3 propane diamine tetra-acetic acid, their sodium salts, their potassium salts and their ammonium salts.

Triazoles and imidazoles such as triazole, imidazole, tolyl triazole and benzo triazole may be used as the anti-rust agent.

Examples of water-soluble polymers that may be used for the invention include polyvinyl alcohol, hydroxy ethyl cellulose, carboxy methyl cellulose and polyethylene oxides.

Examples of other additives that may be used for the invention include organic esters of phosphoric acid having the function of inhibiting the generation of abnormal protrusions (burrs formed by polishing debris attaching to the substrate surface) on the surface of the substrate. They are esters obtained by replacing hydrogen of phosphoric acid $H_3PO_4$ with alkyl group or allyl group. Fatty acid salt type and aromatic salt type may be used. For example, phosphoric acid salt of polyoxyethylene nonylphenolether may be used.

The liquid slurry to be used for the process is alkaline and its pH value is 8 or more. If its pH value is below 8.0, the polishing material precipitates in the slurry liquid while in storage or the gelatinization of the slurry may take place, causing corrosion or dissolution of the surface of the surface of the target object if the target object is a metal.

Next will be explained the texturing process for forming texturing marks on the surface of a substrate for a magnetic hard disk by using a polishing material of this invention. A processing device 20 shown in FIG. 3 may be used to carry out such a texturing process. The texturing is carried out by rotating the substrate 24 in the direction of arrow R, pressing a tape 23 to the surface of the substrate 24 by way of a contact roller 21 while supplying slurry thereto through a nozzle 22, causing the tape 23 to travel in the direction of arrow T and causing the tape 23 to oscillate in the radial direction of the substrate 24.

A polishing material of this invention is dispersed in this slurry. Within this slurry, a plurality of diamond clusters may be aggregated to form aggregated diamond clusters. The slurry to be used for the texturing process comprises a polishing material according to this invention and a dispersant for dispersing this polishing material.

In recent years, the texturing process is coming to be carried out such that the average surface roughness Ra of the substrate 24 will be within the range of 3 Å or more and 6 Å or less and the line density of the texturing lines formed on the surface of the substrate 24 will be 40/µm or more.

For this purpose, diamond clusters with cluster diameters in the range of 30 nm or more and 500 nm or less and average cluster diameter (D50) in the range of 30 nm or more and 200 nm or less are used as the polishing material. The content of the polishing material in the slurry is in the range of 0.005 weight %-0.5 weight % (and preferably 0.005 weight %-0.1 weight %). If the content of the polishing material is less than 0.005 weight %, the polishing power is too low and it takes an excessively long time for the polishing. If the content of the polishing material exceeds 0.5 weight %, on the other hand, the surface of the substrate 24 becomes rough and it becomes impossible to carry out the polishing process such that the average surface roughness of the substrate 24 comes to be 3 Å or more and 6 Å or less and the line density of the texturing lines formed on the surface of the substrate 24 is 40/µm or more.

The dispersing medium comprises water and an additive. The additive contains agents of one or more kinds selected from the group consisting of glycol compounds, higher fatty acid amides, esters of organic phosphoric acid and surfactants. The content of the additive in the slurry is in the range of 1 weight %-10 weight % with respect to the total weight of the slurry.

The tape 23 to be used according to this invention comprises a woven cloth, a non-woven cloth, a flocked cloth or a raised cloth at least with its surface portion to be pressed against the surface of the substrate having thickness in the range of 0.1 μm-5.0 μm. If this thickness is less than 0.1 μm, the contact points between the surface portion of the tape 23 and the polishing material in the slurry decrease and the polishing material cannot work sufficiently on the surface of the substrate 24. If the thickness of the fibers exceeds 5.0 μm, on the other hand, the step differences between the fibers of the surface portion of the tape 23 increases and the surface of the substrate 24 cannot be uniformly processed.

During the texturing process, the diamond clusters of the polishing material of this invention are pressed onto the surface of the substrate 24 while being supported on the surface portion of the tape 23, becoming decomposed to an appropriate degree such that artificial diamond particles that comprise the diamond clusters act on the surface of the substrate 24, polishing it and forming texturing marks on the surface of the substrate 24 without leaving scratches.

Even if aggregated diamond clusters are formed as described above, each of the diamond clusters forming the aggregate is decomposed appropriately and the artificial diamond particles forming each diamond cluster act on the surface of the substrate 24 to polish it and to form texturing marks without leaving scratches.

The invention is explained next with reference to Test Examples and Comparison Examples.

Test Example 1

Texturing slurry of Test Example 1 was produced as follows. First, a mixture of carbon (graphite) powder, an explosive and metal powders of copper, iron, etc. was exploded inside a container to generate diamond clusters having impurities attached therearound (the cluster forming process). This is the so-called graphite explosion shock method.

Next, in order to remove the impurities of diamond clusters, perchloric acid was used to remove residual (not reacted) graphite. After the diamond clusters were washed, they were placed in a beaker, a mixture of condensed nitric acid (1 weight part) and condensed hydrochloric acid (3 weight parts) was added for an acid treatment for 6 hours at normal temperature to remove the metals (the acid treatment process).

Next, after the diamond clusters were washed with pure water, a centrifugal separator was used with a wet method to separate the diamond clusters with cluster diameters 30 nm or more and 350 nm or less and the separated diamond clusters were dried. The purity of artificial diamond particles in these diamond clusters was 3.22 g/cm$^3$.

Next, these diamond clusters (with cluster diameters 30 nm or more and 350 nm or less) were mechanically crushed by using a ball mill (the crushing process).

Next, in order to remove impurities of these crushed diamond clusters, they were washed and then placed in a beaker. A mixture of condensed nitric acid (1 weight part) and condensed hydrochloric acid (3 weight parts) was added for 6 hours at normal temperature to remove the metals (the second acid treatment process).

After these diamond clusters were washed with pure water, a centrifugal separator was used by a wet method to separately collect diamond clusters with cluster diameters within the range of 30 nm or more and 350 nm or less and the average cluster diameter (D50) 80 nm, 120 nm and 150 nm and the sampled clusters were dried (the classification process).

The density of non-diamond carbon contained in the impurities of diamond clusters of the polishing material of Test Example 1 and the density of chlorine in the impurities other than non-diamond carbon were as shown in Table 3. These densities were measured by using a phosphorescent X-ray analyzer ("ZSX100e" (trade name) produced by Rigaku Corporation).

Test Example 2

The production method of Test Example 2 is the same as that of Test Example 1 except that the second acid treatment process is different as follows.

In the second acid treatment process of Test Example 2, the crushed diamond clusters, after being separated, were washed and then placed in a beaker in order to remove impurities. A mixture of condensed nitric acid (1 weight part) and condensed hydrochloric acid (3 weight parts) was added for a treatment for 6 hours at normal temperature. The diamond clusters after this acid treatment were washed with pure water, and the washed diamond clusters were placed in another beaker. A mixture of condensed sulfuric action (10 weight parts) and condensed nitric acid (1 weight part) was added for a heat treatment for 2 hours at 130° C. and it was washed with pure water after it was left for 12 hours. The pH value of the diamond clusters after the washing was about 4.

Next, as in Test Example 1, a centrifugal separator was used by a wet method to separately collect diamond clusters with cluster diameters within the range of 30 nm or more and 350 nm or less and the average cluster diameter (D50) 80 nm, 120 nm and 150 nm and the sampled clusters were dried (the classification process).

The density of non-diamond carbon contained in the impurities of diamond clusters of the polishing material of Test Example 2 and the density of chlorine in the impurities other than non-diamond carbon were as shown in Table 3. These densities were measured by using the phosphorescent X-ray analyzer used in Test Example 1.

Test Example 3

The production method of Test Example 3 is the same as that of Test Example 1 except that the second acid treatment process is different as follows.

In the second acid treatment process of Test Example 3, the crushed diamond clusters, after being separated, were washed and then placed in a beaker in order to remove impurities. A mixture of condensed sulfuric acid (10 weight parts) and condensed nitric acid (1 weight part) was added for a heat treatment for 2 hours at 130° C. The diamond clusters were left for 12 hours and after they were washed with pure water, they were placed in another beaker into which a mixture of condensed nitric acid (1 weight part) and condensed hydrochloric acid (3 weight parts) was added for a treatment for 6 hours at normal temperature. They were then washed. The pH value of the diamond clusters after the washing was about 4.

Next, as in Test Example 1, a centrifugal separator was used by a wet method to separately collect diamond clusters with cluster diameters within the range of 30 nm or more and 350 nm or less and the average cluster diameter (D50) 80 nm, 120 nm and 150 nm and the sampled clusters were dried (the classification process).

The density of non-diamond carbon contained in the impurities of diamond clusters of the polishing material of Test Example 3 and the density of chlorine in the impurities other than non-diamond carbon were as shown in Table 3. These densities were measured by using the phosphorescent X-ray analyzer used in Test Example 1.

Comparison Example 1

The production method of Comparison Example 1 is the same as that of Test Example 1 except that the second acid treatment process is different as follows.

In the second acid treatment process of Comparison Example 1, the crushed diamond clusters, after being separated, were washed and then placed in a beaker in order to remove impurities. A mixture of condensed sulfuric acid (10 weight parts) and condensed nitric acid (1 weight part) was added for a heat treatment for 2 hours at 130° C. The diamond clusters were left for 12 hours and were washed with pure water. The pH value of the diamond clusters after the washing was about 4. It is to be noted that the second acid treatment process was carried out in Comparison Example by using condensed acids not containing chlorine.

Next, as in Test Example 1, a centrifugal separator was used by a wet method to separately collect diamond clusters with cluster diameters within the range of 30 nm or more and 350 nm or less and the average cluster diameter (D50) 80 nm, 120 nm and 150 nm and the sampled clusters were dried (the classification process).

The density of non-diamond carbon contained in the impurities of diamond clusters of the polishing material of Comparison Example 1 and the density of chlorine in the impurities other than non-diamond carbon were as shown in Table 3. These densities were measured by using the phosphorescent X-ray analyzer used in Test Example 1.

Comparison Example 2

The production method of Comparison Example 2 is the same as that of Test Example 1 except that the second acid treatment process is different as follows.

In the second acid treatment process of Comparison Example 2, the crushed diamond clusters, after being separated, were washed and then placed in a beaker in order to remove impurities. A mixture of condensed nitric acid (1 weight part) and condensed hydrochloric acid (3 weight parts) was added for a treatment for 6 hours at normal temperature. The diamond clusters were then washed with pure water and was placed in another beaker into which a mixture of condensed sulfuric acid (10 weight parts) and condensed nitric acid (1 weight part) was added for a heat treatment for two hours at 130° C. The mixture was left for 12 hours and then washed with pure water. The pH value of the diamond clusters after the washing was about 4. Thereafter, ammonium water of concentration 1% was added until the pH value came to be 7 by removing chlorine attached to the diamond clusters in the form of ammonium chloride ($NH_4Cl$) such that the density of chlorine attached to the diamond clusters became reduced.

Next, as in Test Example 1, a centrifugal separator was used by a wet method to separately collect diamond clusters with cluster diameters within the range of 30 nm or more and 350 nm or less and the average cluster diameter (D50) 80 nm, 120 nm and 150 nm and the sampled clusters were dried (the classification process).

The density of non-diamond carbon contained in the impurities of diamond clusters of the polishing material of Comparison Example 2 and the density of chlorine in the impurities other than non-diamond carbon were as shown in Table 3. These densities were measured by using the phosphorescent X-ray analyzer used in Test Example 1.

Comparison Test

The polishing materials of Test Examples 1-3 and Comparison Examples 1-2 were each used to texture a substrate for a magnetic hard disk and the results were compared regarding the appearance of spots. Presence and absence of spots were examined by using an optical observation apparatus ("VMX-2100" (trade name) produced by Vision PSYTEC Co. Ltd.) using a 180 W metal halide light source to obtain photographs at a low magnification ratio (about 4 times) and by using these photographs.

As samples, use was made of 2.5-inch glass substrates with mirror-polished surfaces on which a surface reinforcing process was carried out. The average surface roughness (Ra) of these glass substrates was about 0.15 nm prior to the texturing process.

Texturing process was carried out by using an apparatus as shown in FIG. 3 by rotating the glass substrate, pressing a texturing tape thereonto through the contact roller while texturing slurry was supplied to the surface of the substrate, running this texturing tape and oscillating this texturing tape in the radial direction of the glass substrate. A non-woven cloth tape of thickness 700 μm comprising fibers of thickness 1 μm was used as the texturing tape.

Texturing slurry was produced by mixing these polishing materials (abrading particles) of Test Examples 1-3 and Comparison Examples 1-2 in pure water, thereafter using an ultrasonic homogenizer ("US-150T" (trade name) produced by Nippon Seiki Seisakusho) to disperse them, adding glycol compound, organic phosphate, higher fatty acid amide and nonionic surfactant as an additive and using the aforementioned ultrasonic homogenizer again to further disperse the particles. The composition of texturing slurry was as shown in Table 1.

TABLE 1

| Composition of texturing slurry | Abrading particles | 0.05 weight % |
|---|---|---|
| | Additive | 5 weight % |
| | Pure water | 94.95 weight % |
| Composition of additive (total = 100 weight %) | Glycol compound | 50 weight % |
| | Organic phosphate | 15 weight % |
| | Higher fatty acid amide | 15 weight % |
| | Nonionic surfactant | 20 weight % |

The conditions of the texturing process are shown in Table 2 below.

TABLE 2

| Rotational speed of substrate | 300 rpm |
|---|---|
| Speed of tape | 6 cm/minute |
| Supply rate of slurry | 15 cc/minute |
| Hardness of contact roller | 45 duro |
| Oscillation frequency (amplitude) | 5 Hz (1 mm) |
| Pressure by contact roller | 4.5 kg |
| Time of processing | 30 seconds |

Results of Comparison Test

The results of the comparison test are shown in Table 3. Table 3 shows clearly that the surface of a substrate could be processed without forming spots if a polishing material of this invention is used.

TABLE 3

| | Average cluster diameter (nm) | Carbon density (%) | Chlorine density (%) | Average surface roughness (Å) | Line density (lines/μm) | Presence of spots |
|---|---|---|---|---|---|---|
| Test Example 1 | 80 | 96.8 | 2.8 | 4.1 | 75 | No |
| | 120 | 96.9 | 2.6 | 5.2 | 50 | No |
| | 150 | 97.3 | 2.2 | 5.5 | 45 | No |
| Test Example 2 | 80 | 97.5 | 1.6 | 4.3 | 60 | No |
| | 120 | 98.0 | 1.5 | 5.2 | 48 | No |
| | 150 | 97.4 | 1.3 | 5.7 | 42 | No |
| Test Example 3 | 80 | 96.5 | 3.1 | 4.5 | 66 | No |
| | 120 | 96.6 | 2.9 | 5.3 | 50 | No |
| | 150 | 96.2 | 2.9 | 5.8 | 44 | No |
| Comparison Example 1 | 80 | 97.5 | 0.2 | 3.3 | 68 (unclear) | Yes |
| | 120 | 98.0 | 0.2 | 4.3 | 45 | Yes |
| | 150 | 98.0 | 0.2 | 4.5 | 40 | Yes |
| Comparison Example 2 | 80 | 97.2 | 0.2 | 3.2 | 60 (unclear) | Yes |
| | 120 | 97.5 | 0.1 | 4.1 | 41 | Yes |
| | 150 | 98.2 | 0.1 | 4.5 | 38 | Yes |

What is claimed is:

1. A method of producing a polishing material, said method comprising:

a cluster forming process of obtaining diamond clusters by an explosion shock method, each of said diamond clusters being a combination of artificial diamond particles having primary particle diameters of 20 nm or less and impurities that are attached around said diamond particles; and an impurity removing process of removing said impurities such that density of non-diamond carbon contained in said impurities becomes 95% or more and 99% or less and that density of chlorine contained in other than non-diamond carbon in said impurities becomes 0.5% or more.

2. The method of claim 1 wherein said impurity removing process is for removing said impurities such that density of chlorine contained in other than non-diamond carbon in said impurities becomes 0.5% or more and 3.5% or less.

3. The method of claim 1 wherein said impurity removing process includes:

a crushing process of mechanically crushing said diamond clusters; and an acid treatment process of carrying out an acid treatment on said crushed diamond clusters by using a condensed acid of at least one kind selected from the group consisting of perchloric acid, condensed sulfuric acid, condensed nitric acid and condensed hydrochloric acid, wherein said condensed acid contains at least chlorine.

4. The method of claim 3 wherein said impurity removing process includes the step of separating those of diamond clusters having diameters of 30 nm or more and 500 nm or less from the diamond clusters after said cluster forming process; wherein said separated diamond clusters having diameters of 30 nm or more and 500 nm or less are mechanically crushed in said crushing process.

5. The method of claim 1 wherein said impurity removing process includes an acid treatment process of carrying out an acid treatment on said diamond clusters by using a condensed acid of at least one kind selected from the group consisting of perchloric acid, condensed sulfuric acid, condensed nitric acid and condensed hydrochloric acid, wherein said condensed acid contains chlorine.

6. The method of claim 5 wherein said impurity removing process includes a second acid treatment process of carrying out an acid treatment on said crushed diamond clusters after said acid treatment process by using a condensed acid of at least one kind selected from the group consisting of perchloric acid, condensed sulfuric acid, condensed nitric acid and condensed hydrochloric acid, wherein said condensed acid used in said second acid treatment process contains chlorine.

7. The method of claim 6 wherein said impurity removing process includes the step of separating those of diamond clusters having diameters of 30 nm or more and 500 nm or less from the diamond clusters after said acid treatment process; wherein said separated diamond clusters having diameters of 30 nm or more and 500 nm or less are mechanically crushed in said crushing process.

8. The method of claim 7 further comprising a classification process of classifying the diamond clusters after said impurity removing process, said classification process including the step of separating out of the diamond clusters after said impurity removing process those that have diameters 30 nm or more and 500 nm or less and an average diameter of 30 nm or more and 200 nm or less.

* * * * *